(No Model.) 2 Sheets—Sheet 1.
F. WHEELER.
CLUTCH AND STOP MECHANISM FOR PRESSES.
No. 470,797. Patented Mar. 15, 1892.
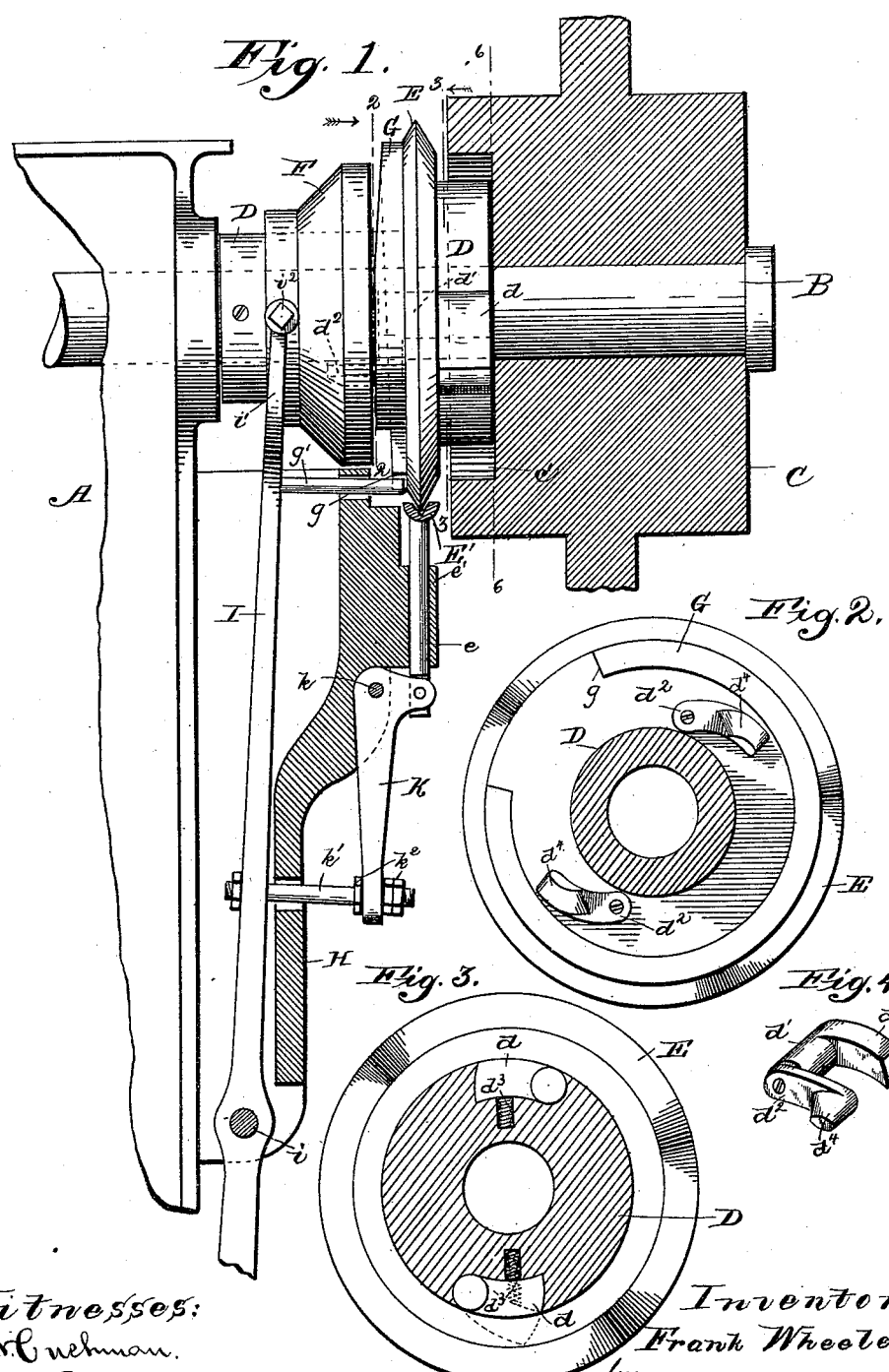
Witnesses:
A. V. Cushman
Geo. H. Chandler
Inventor
Frank Wheeler
by Arthur W. Harrison
Attorney (No Model.) 2 Sheets—Sheet 2.
F. WHEELER.
CLUTCH AND STOP MECHANISM FOR PRESSES.
No. 470,797. Patented Mar. 15, 1892.
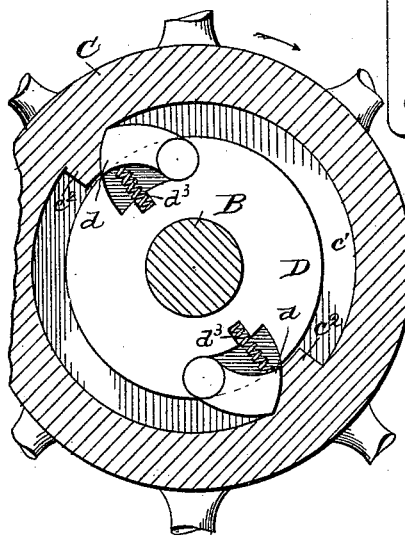
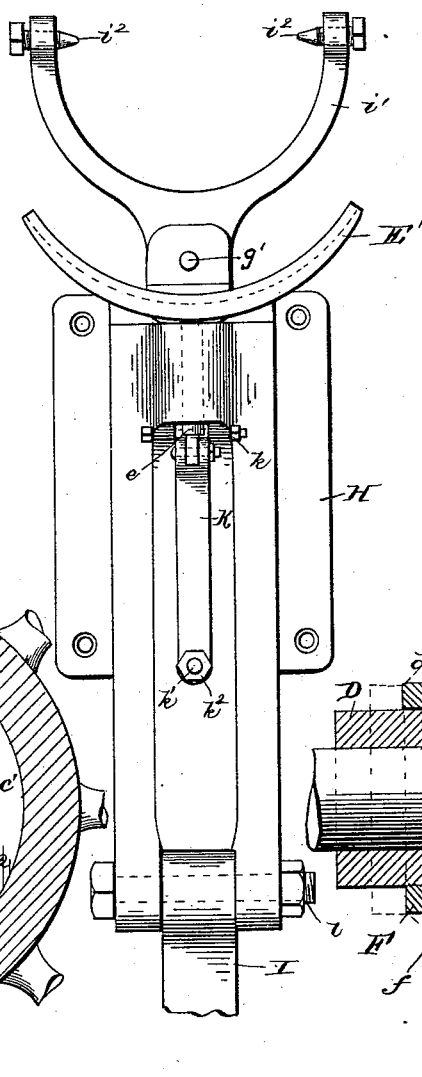
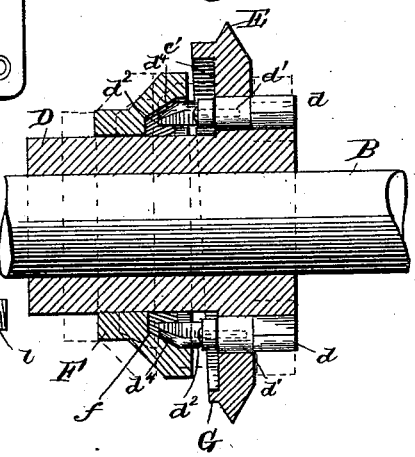
Witnesses:
A. V. Cushman.
Geo. Chandler.
Inventor
Frank Wheeler
by
Arthur H. Harrison
Attorney

UNITED STATES PATENT OFFICE.

FRANK WHEELER, OF MERIDEN, CONNECTICUT.

CLUTCH AND STOP MECHANISM FOR PRESSES.

SPECIFICATION forming part of Letters Patent No. 470,797, dated March 15, 1892.

Application filed December 14, 1891. Serial No. 415,007. (No model.)

*To all whom it may concern:*

Be it known that I, FRANK WHEELER, of Meriden, in the county of New Haven and State of Connecticut, have invented new and useful Improvements in Clutch and Stop Mechanism for Presses; and I do hereby declare the following to be a full, clear, and exact description of said invention, reference being had to the accompanying drawings, and to the letters of reference marked thereon, which form a part of this specification.

My invention relates to a clutch and stop mechanism for power-presses; and my improvements have particular reference to means for equalizing the strain of the driving-wheel on the shaft, means for automatically controlling the action of a friction shoe or brake, and means for positively stopping the motion of the shaft at the proper point after its release from the power of the driving-wheel.

In some power-presses or die-presses heretofore constructed means for exerting a constant friction upon the shaft have been employed in order to stop the latter when the power is disconnected therefrom; but such devices are objectionable not only on account of excessive wear and the power required, but also for the reason that they do not insure the stoppage of the shaft and its pitman-operating crank at the proper point, resulting often in serious accidents. It is also common to use a dog pin or pawl and annular ratchet form of clutch for connecting the driving-wheel to the shaft of a power-press; but in such form the single dog or pawl produces an unequal strain that is injurious.

My objects in this invention are to produce simple mechanism for a power-press by means of which when the press is started the shaft and its pitman-operating crank may make but a single revolution and then positively stop, with the crank or eccentric holding the pitman or die in elevated position; also, to provide for the equalization of the strain of the driving-wheel on the shaft by having two diametrically-opposite points of connection with simple and durable means for operating them.

To these ends my invention consists in the construction and combination of parts, as hereinafter described and claimed.

In the accompanying drawings, Figure 1 is a side elevation, partly in section and with parts broken away, of my improvement. Fig. 2 is a detail view of the driving-collar or pawl-carrier, looking in the direction of the arrow from the line 2 2 of Fig. 1. Fig. 3 is a detail view of the same from the opposite side, or from line 3 3 of Fig. 1. Fig. 4 is a detail perspective view of one of the pawls and its connected cam-lever. Fig. 5 is a detail of the treadle-lever and its fork and the friction-shoe and supporting-bracket as they would appear looking from the right of Fig. 1. Fig. 6 is a section on line 6 6 of Fig. 1. Fig. 7 is a longitudinal section of the pawl-carrier and the sliding cone-sleeve for operating the cam-levers of the pawls.

Similar reference-letters indicate similar parts in all of the views.

A represents a portion of the frame or body of a press of the solid-back type, and B the shaft thereof, which shaft at its end (not shown) may have any of the usual forms of eccentric or crank for operating the pitman and die-carrier.

C represents the hub of a driving-wheel, loosely mounted on the shaft and retained thereon by any suitable means, as the collar $c$. In this hub, as shown in Figs. 1 and 6, is an annular recess $c'$, having at diametrically-opposite points of its outer circumference two inwardly-projecting lugs $c^2$. Secured to the shaft between the frame A and the hub C is the driving-collar or pawl-carrier D, having an annular friction-disk E, preferably having a periphery V-shaped in cross-section. Passing through each of two holes formed at diametrically-opposite points of the disk E is the shank or stem $d'$ of a pawl $d$, that is pressed outwardly against the wall of the recess $c'$ by means of a spring $d^3$. To the other end of each shank $d'$ is secured a lever $d^2$, having an inclined or cam surface, as at $d^4$. The lever-shank and pawl might be made integral upon providing suitable means for securing the shank to rotate slightly in a bearing in the disk E.

F represents a sleeve loosely fitting the hub of pawl-carrier D and having a cone-shaped flange $f$, adapted to pass over and press toward the axis of the shaft the ends of cam-levers $d^2$, and thus depress the pawls $d$ away from contact with the stops $c^2$.

Pivoted to the frame at $i$ is a lever I, having a yoke $i'$ at its upper end provided with set-screws $i^2$, entering suitable recesses in the sides of the cone-sleeve F, whereby the said lever may, by means of a treadle or other suitable means at its lower end, (not shown,) cause the said sleeve to move along the hub of the driving-collar and compress or release the pawls. This lever I, as shown, is contained partly within a bracket H, secured to the frame A, which bracket supports the fulcrum $k$ of a bell-crank lever K, the short arm of which is pivotally connected with the lower end of a rod $e$, fitted to slide in a bearing $e'$, formed in bracket H and carrying at its upper end a segmental friction shoe or saddle E', which is preferably V-shaped in cross-section to fit the periphery of the disk E.

A connection is formed between the lower or longer end of lever K with the lever I, and this connection, as shown, consists of a rod $k'$, passing through a hole in bracket H and secured to lever I at one end and its other end passing through an eye in the lower end of lever K and having set-nuts $k^2$ each side of the latter. The object of these set-nuts is to regulate the friction exerted by shoe E' when the lever I is thrown to the position shown in Fig. 1, in an obvious manner.

Referring to Figs. 1 and 2, G represents an annular cam consisting of a flange projecting laterally from the side of disk E outside of cam-levers $d^2$. This cam varies in height gradually from one end, where the flange is cut away, as shown more clearly in Fig. 2, to its other end, and the end having the least height forms a shoulder, as at $g$, adapted to abut against the side of one end of a stop-pin $g'$, which passes through a hole in the bracket H and is secured at its other end to the lever I.

With the parts in the position shown in Fig. 1 and the driving-wheel revolving in the direction of the arrow in Fig. 6 the machine will be at rest with the pawls depressed out of engagement by the lugs $c^2$, the friction-shoe held in engagement with the disk, and the stop-pin $g'$ in the path of the stop or shoulder $g$. Upon the operation of the lever I to move its end above the fulcrum to the left in Fig. 1 the pin $g'$ will be removed from in front of stop $g$, the friction-shoe will recede, and the cone-sleeve releases the cam-lever $d^2$, whereupon the pawls $d$ are moved outward by their springs $d^3$ and engaged by the lugs $c^2$, thus revolving the pawl-carrier and the shaft as long as the lever I is held in the last-mentioned position. Should the lever I be returned to its normal position as soon as the shaft has been started, it is obvious that the stop-pin $g'$ could not reenter the space between the ends of the annular cam, but would return with its end on the surface of the cam, and owing to the other end of the pin being connected with the lever I the parts could not return to their normal position until the end of the pin passes off the higher end of the cam. This immediately causes the disengagement of the clutch, applies the friction-shoe, and brings the side of the end of the pin into the path of shoulder $g$ to act as a positive stop if the friction-shoe fails to stop the driving collar and shaft in time.

In practice I prefer to operate the lever I in one direction by a treadle and the reverse by a spring; but such construction, being well known, I do not deem it necessary to illustrate the same.

Having now described my invention, what I claim, and desire to secure by Letters Patent, is—

1. In a stop mechanism for presses, the combination, with a rotary disk and a friction-brake therefor, of a positive stop separate from the brake and movable parallel with the axis of the disk and connections for simultaneously operating the brake and stop, substantially as described.

2. In a clutch and stop mechanism for presses, the combination, with the clutch, of a friction-brake, a positive stop, and connections for simultaneously opening the clutch and operating the brake and stop, substantially as described.

3. In a clutch for power-presses, the combination, with the driving-wheel having two diametrically-opposite lugs, of the shaft carrying two pawls adapted to engage said lugs, said pawls having projections, and a movable sleeve under the control of the operator to engage said projections, and thereby simultaneously disengage both pawls from the lugs, substantially as described.

4. The combination, with the shaft of a power-press, of a driving-wheel loose thereon, a collar having a stop-shoulder fixed to said shaft, clutch devices carried by said collar and adapted to be connected to the driving-wheel, a sleeve movable on the collar to control the clutch devices, and a lever connected with the sleeve and carrying a projection adapted to engage with the stop-shoulder, substantially as described.

5. The combination, with the shaft of a power-press, of a driving-wheel loose thereon, a collar secured thereto and having an annular cam and a stop-shoulder, clutch devices carried by said collar and adapted to be connected to the driving-wheel, a sleeve movable on the collar to control the clutch devices, and a lever connected with the sleeve and carrying a projection adapted to engage with the stop-shoulder, substantially as described.

6. The combination, with the shaft of a power-press, of a driving-wheel loose thereon, a collar secured thereto and having an annular cam, a stop-shoulder, and a friction-disk, clutch devices carried by said collar and adapted to be connected to the driving-wheel, a sleeve movable on the collar to control the clutch devices, a lever connected with the sleeve and carrying a projection adapted to engage with the stop-shoulder, a friction-shoe for the disk, and connections between said shoe and lever, substantially as described.

In testimony whereof I affix my signature in presence of two subscribing witnesses.

FRANK WHEELER.

Witnesses:
I. L. HOLT,
F. A. STEARNS.